(12) United States Patent
Ovenstone et al.

(10) Patent No.: US 10,065,238 B2
(45) Date of Patent: Sep. 4, 2018

(54) INTUMESCENT SEALING FOR METAL CASTING APPARATUSES

(71) Applicant: VESUVIUS CRUCIBLE COMPANY, Wilmington, DE (US)

(72) Inventors: James Ovenstone, Suhaou (CN); Martin Zhou, Shanghai (CN)

(73) Assignee: VESUVIUS USA CORPORATION, Champaign, IL (US)

( * ) Notice: Subject to any disclaimer, the term of this patent is extended or adjusted under 35 U.S.C. 154(b) by 136 days.

(21) Appl. No.: 14/365,772

(22) PCT Filed: Dec. 14, 2012

(86) PCT No.: PCT/IB2012/002949
§ 371 (c)(1),
(2) Date: Jun. 16, 2014

(87) PCT Pub. No.: WO2013/088249
PCT Pub. Date: Jun. 20, 2013

(65) Prior Publication Data
US 2015/0114586 A1    Apr. 30, 2015

(30) Foreign Application Priority Data

Dec. 16, 2011 (EP) .................................. 11193966

(51) Int. Cl.
*B22D 41/50* (2006.01)
*C03C 8/24* (2006.01)
(Continued)

(52) U.S. Cl.
CPC ........... *B22D 41/502* (2013.01); *B22D 41/08* (2013.01); *B22D 41/22* (2013.01); *B22D 41/32* (2013.01);
(Continued)

(58) Field of Classification Search
CPC ....... C04B 28/26; C04B 14/024; C04B 14/10; C04B 14/202; C04B 2103/608;
(Continued)

(56) References Cited

U.S. PATENT DOCUMENTS 4,945,015 A    7/1990 Milner et al.
4,952,615 A *  8/1990 Welna .................... C09K 3/10
                                                    521/145
(Continued)

FOREIGN PATENT DOCUMENTS

DE    3620413 A1    12/1987
EP    0598479 A1    5/1994
(Continued)

OTHER PUBLICATIONS

Jp H07164133, Yamaguchi, Takuo, sliding nozzle for molten steel vessel, Jun. 27, 1995 (machine translation version of JP H07164133).*

*Primary Examiner* — Scott R Kastler
*Assistant Examiner* — Michael Aboagye
(74) *Attorney, Agent, or Firm* — Thomas Clinton; Donald M. Satina (57) ABSTRACT

A nozzle assembly, for a metal casting apparatus selected from a sliding gate and a tube exchange device, comprises a first refractory element comprising a first coupling surface which includes a first bore aperture, and a second refractory element comprising a second coupling surface, which includes a second bore aperture, the first and second elements being coupled to one another in a sliding translation relationship through their respective first and second coupling surfaces such that the first and second bore apertures can be brought into and out of registry to define, when in registry, a continuous bore for discharging molten metal from a molten metal inlet to a molten metal outlet of said nozzle assembly. A sealing member is provided between the (Continued)

first and second coupling surfaces of the first and second elements. The sealing member comprises a thermally intumescent material.

17 Claims, 4 Drawing Sheets

(51) Int. Cl.

| | | |
|---|---|---|
| B22D 41/36 | (2006.01) | |
| B22D 41/54 | (2006.01) | |
| B22D 41/22 | (2006.01) | |
| B22D 41/32 | (2006.01) | |
| B22D 41/08 | (2006.01) | |
| F16J 15/06 | (2006.01) | |
| C04B 28/26 | (2006.01) | |
| C04B 111/28 | (2006.01) | |
| C09K 3/10 | (2006.01) | |

(52) U.S. Cl.
CPC ............ *B22D 41/36* (2013.01); *B22D 41/50* (2013.01); *B22D 41/54* (2013.01); *C03C 8/24* (2013.01); *C04B 28/26* (2013.01); *F16J 15/065* (2013.01); *C03C 2209/00* (2013.01); *C04B 2111/28* (2013.01); *C09K 3/1003* (2013.01); *C09K 2003/1037* (2013.01); *C09K 2200/0208* (2013.01); *C09K 2200/0252* (2013.01); *C09K 2200/0265* (2013.01); *Y10T 29/49938* (2015.01)

(58) Field of Classification Search
CPC ....... C04B 22/10; C04B 22/106; C04B 24/32; C04B 14/20; C04B 2111/28; B22D 41/08; B22D 41/22; B22D 41/32; B22D 41/36; B22D 41/50; B22D 41/502; B22D 41/54; C03C 8/24; C09K 2003/1037; C09K 3/1003; F16J 15/065
USPC ........... 222/600; 266/236; 29/522.1; 501/15; 277/300; 164/437
See application file for complete search history.

(56) References Cited

U.S. PATENT DOCUMENTS

| | | | |
|---|---|---|---|
| 5,340,643 A | | 8/1994 | Ou et al. |
| 5,531,454 A | | 7/1996 | Borneby |
| 5,548,934 A | * | 8/1996 | Israelson ................ A62C 2/065 52/1 |
| 6,149,972 A | * | 11/2000 | Greinke .............. C01B 31/0423 427/212 |
| 6,747,074 B1 | * | 6/2004 | Buckingham ............ C09K 3/10 523/179 |
| 2003/0157015 A1 | | 8/2003 | Reinheimer et al. |
| 2009/0075539 A1 | * | 3/2009 | Dimanshteyn ............ B32B 5/18 442/1 |

FOREIGN PATENT DOCUMENTS

| | | | | |
|---|---|---|---|---|
| JP | S58152086 A | | 9/1983 | |
| JP | H07118073 A | | 5/1995 | |
| JP | H07164133 | * | 6/1995 | ........... B22D 41/502 |
| JP | H07164133 A | | 6/1995 | |
| JP | 2002038470 A | | 2/2002 | |
| WO | 98/17421 | | 4/1998 | |
| WO | 01/08837 A1 | | 2/2001 | |
| WO | 02/083344 A1 | | 10/2002 | |
| WO | WO 02/083344 | * | 10/2002 | ........... B22D 41/502 |

* cited by examiner

INTUMESCENT SEALING FOR METAL CASTING APPARATUSES

BACKGROUND OF THE INVENTION

(1) Field of the Invention

The present invention generally relates to continuous metal casting lines. In particular, it relates to a sealing which is particularly suitable for sealing the interface between elements of a nozzle assembly in a metal casting line which are coupled in a translation sliding relationship, such as a gate plate in a sliding gate device or a nozzle unit suitable for being used with a tube exchange device.

(2) Description of the Related Art

Figure 1:
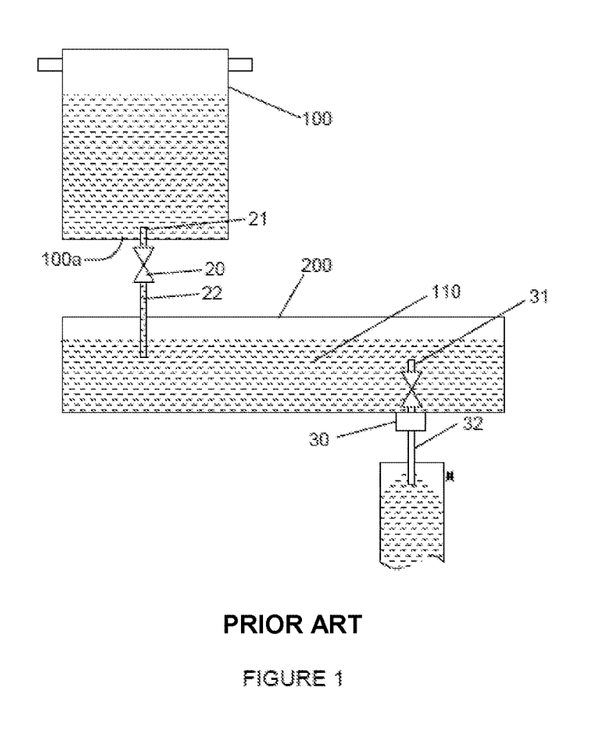
FIG. 1: shows schematically a typical continuous casting line.

In metal forming processes, molten metal is transferred from one metallurgical vessel to another, to a mould or to a tool. For example, as shown in FIG. 1 a ladle (100) is filled with a metal melt out of a furnace and transferred to a tundish (200). The molten metal can then be cast from the tundish to a continuous casting mould for forming slabs, blooms, billets or other type of continuously cast products or to ingots or other discrete defined shapes in foundry moulds. Flow of metal melt out of a metallurgic vessel is driven by gravity through various nozzle assemblies (20, 30) located at the bottom of such vessels.

Figure 2:
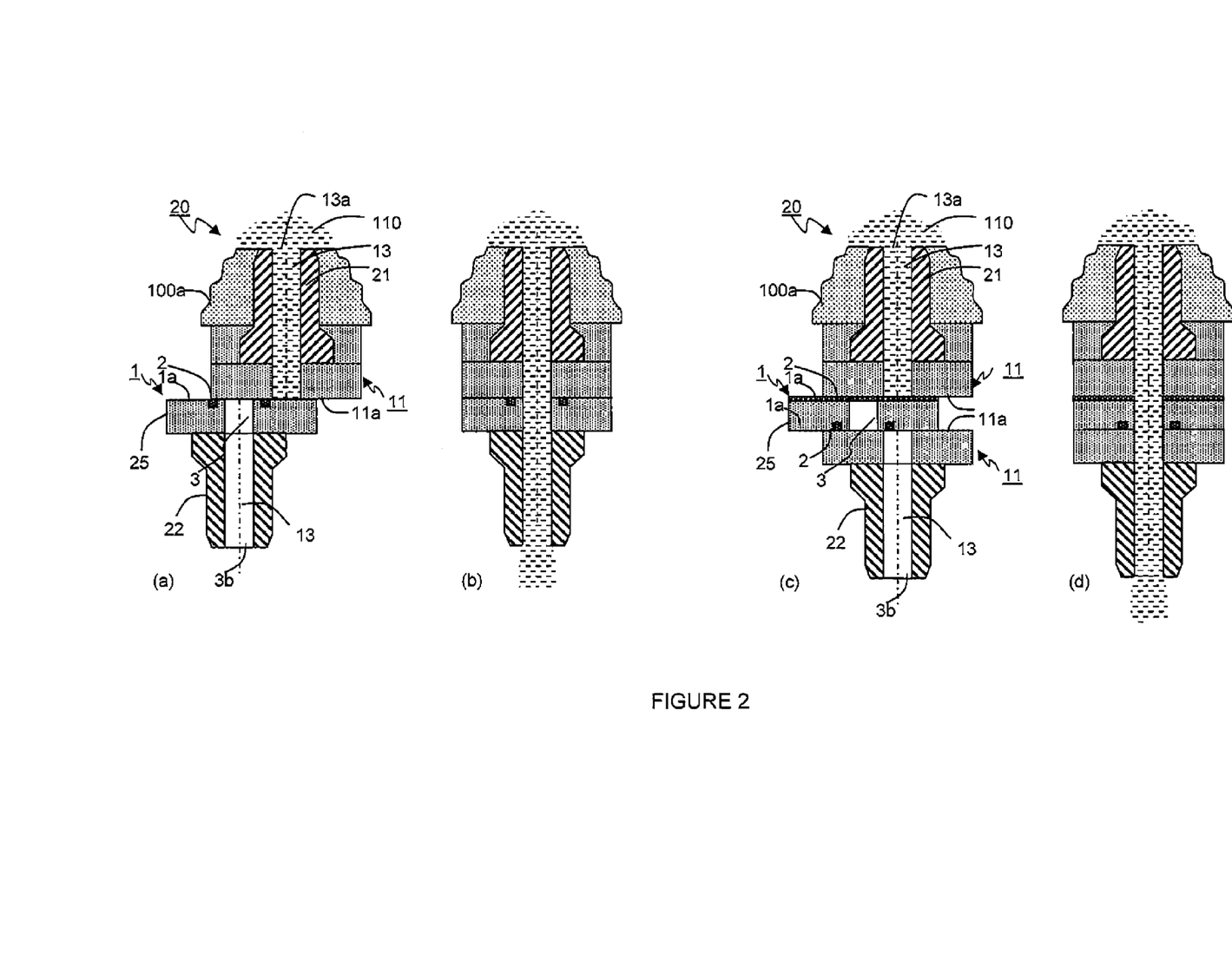
FIG. 2: shows a side cut view of a first (a)&(b) and second (c)&(d) embodiments of a slide gate device according to the present invention.

Some of such nozzle assemblies comprise elements which are movable with respect to each other. For example, the ladle (100) is provided at its bottom floor (100a) with a slide gate device (20) as illustrated in FIG. 2 coupling an inner nozzle (21) embedded in a refractory coating of the ladle floor to a collector nozzle (22) extending outside of the ladle. A gate plate (25) comprising a through bore is sandwiched between the inner nozzle and the collector nozzle and is able to linearly slide between the two to bring the through bore thereof into or out of registry with the through bores of the inner and outer nozzles.

Figure 3:
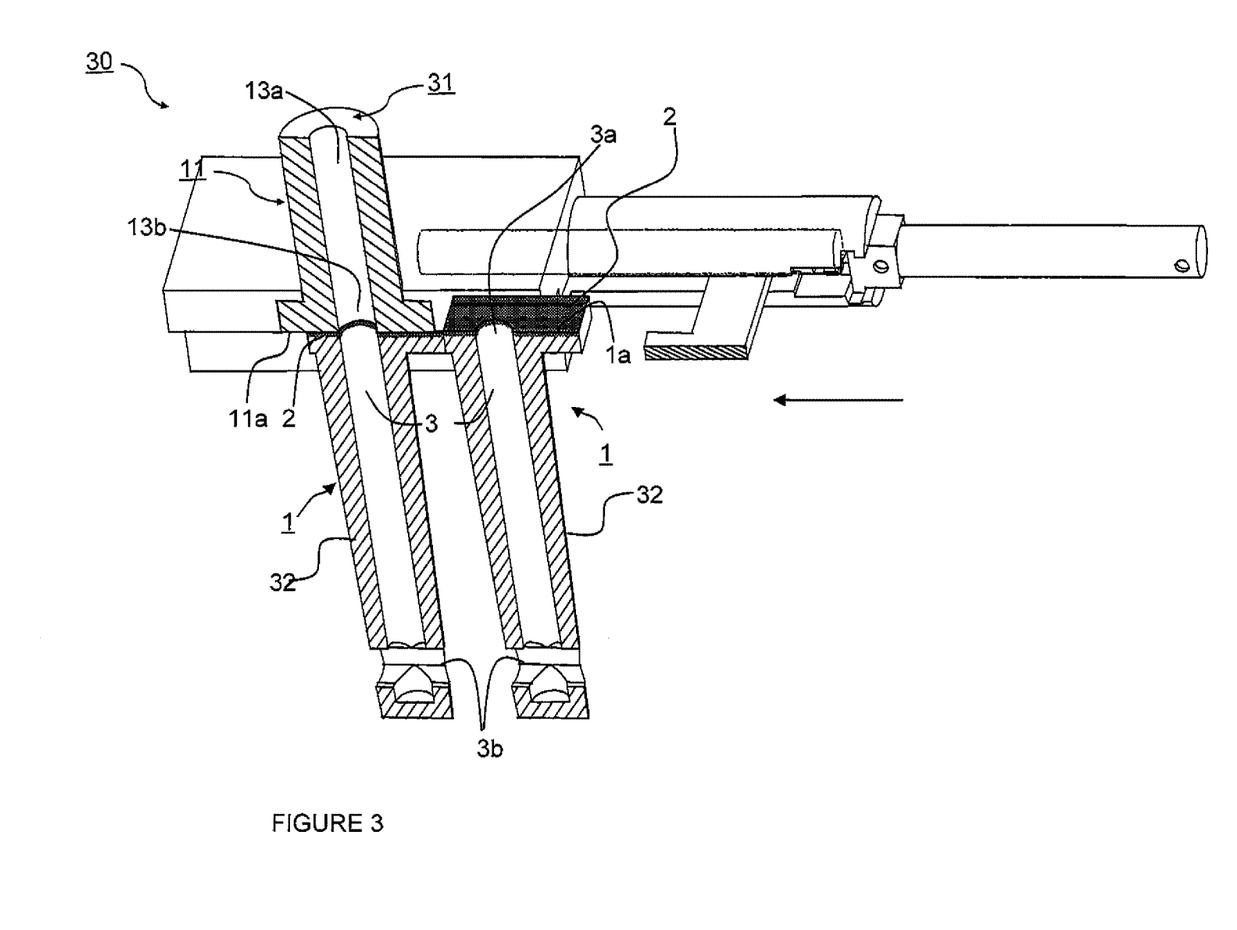
FIG. 3: shows a cut-off perspective view of a tube exchange device according to the present invention
Figure 4:
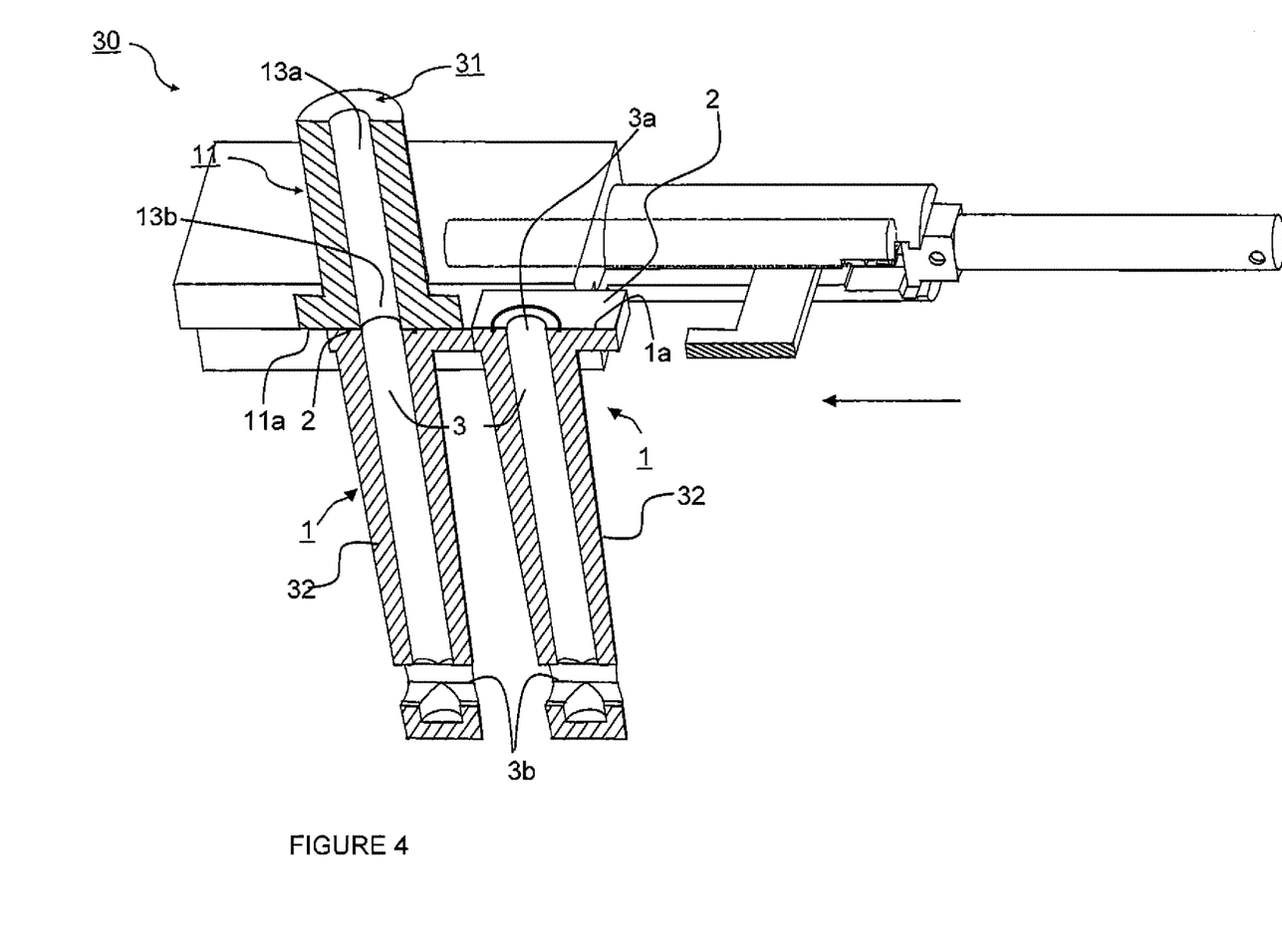
FIG. 4: shows a cut-off perspective view of an alternative tube exchange device according to the present invention

Another example is a tube exchange device (30), mounted at the bottom floor of a tundish (200) for discharging the molten metal contained in the tundish into a mould or a tool. It comprises an inner nozzle (31) embedded in the refractory coating of the tundish floor and a pouring nozzle (32) extending outside of the tundish. Because the service time of such pouring nozzles is generally shorter than a full casting operation, a tube exchange device is often used allowing the changing of the pouring nozzle (32) without interrupting the casting operation, by sliding a new pouring nozzle along appropriate guiding means to push out and replace the worn pouring nozzle as illustrated in FIGS. 3 and 4.

Perfect tightness to air of the interfaces between coupled elements is of prime importance in a metal casting equipment because, on the one hand, most molten metals promptly oxidize in contact with air at such high temperatures and, on the other hand, because of the flow through the nozzle bore, air suction is created at any untight interface by Venturi effect. This problem is particularly sensitive in elements which can be moved during operation and yet, must retain their full tightness.

To prevent air from being sucked into gaps at interfaces between elements of a nozzle assembly, two elements are coupled to one another by clamping means, such as springs, applying strong forces to press the contact surfaces of the two elements against one another. This solution has limitations, because too high clamping forces would jeopardize the sliding of the two elements with respect to each other and it is inefficient in case of small defects at the interface, such as some local roughness. A gas blanket is often used by injecting a gas such as argon or nitrogen, through channels provided at or adjacent to the interfaces. This solution, however, consumes large volumes of gas and does not prevent completely air intake. The surfaces in sliding contact are often coated with a layer of lubricant, such as graphite, embedded in a binder such as water glass and additives such as clays, like bentonite or the like. Such lubricating layers act to some extent as a sealing of the interface between two refractory surfaces, but the environmental conditions around nozzle assemblies are so extreme, with locally very high temperatures and high heat gradients, that the sealing effect is generally insufficient to ensure complete air tightness of the assembly.

The present invention proposes a solution for ensuring an air tight interface between two refractory surfaces of a nozzle assembly, even when they are coupled to one another in a sliding translation relationship. The present solution does not require any fine machining of the coupling surfaces.

BRIEF SUMMARY OF THE INVENTION

The present invention is defined by the attached independent claims. The dependent claims define preferred embodiments. In particular, the present invention concerns nozzle assembly for a metal casting apparatus selected from a sliding gate and a tube exchange device, said nozzle assembly comprising:
- a first refractory element comprising a first coupling surface which includes a first bore aperture, and
- a second refractory element comprising a second coupling surface, which includes a second bore aperture, the first and second elements being coupled to one another in a sliding translation relationship through their respective first and second coupling surfaces such that the first and second bore apertures can be brought into and out of registry to define, when in registry, a continuous bore for discharging molten metal from a molten metal inlet to a molten metal outlet of said nozzle assembly,
- a sealing member provided between the first and second coupling surfaces of the first and second elements, characterized in that, the sealing member comprises a thermally intumescent material.

In the present context, a "nozzle assembly" is defined as any assembly comprising at least one nozzle comprising a bore allowing the casting of molten metal out of a vessel.

The intumescent sealing member of a nozzle assembly according to the present invention preferably has:
- an initial expansion temperature, $T_i$, of at least 130° C., preferably at least 400° C., more preferably at least 600° C., and/or
- a maximum relative expansion, $V_{max}/V_{20}$, at a temperature, $T_{max}$, of maximum expansion comprised between, $T_i$, and 1400° C., with respect to its volume measured at 20° C., of at least 10, preferably at least 25, more preferably at least 50, most preferably at least 80.

A "thermally intumescent material" is a substance which swells as a result of heat exposure, thus increasing in volume, and decreasing in density. The swelling of an intumescent material is generally caused by a phase transformation of at least one component of said material and is clearly distinguished from normal thermal expansion which generally increases linearly with temperature, $\Delta V = \alpha \Delta T$, wherein α is the coefficient of heat expansion. An intumescent material suitable for the present invention may be composed of a layered material which is modified by intercalating other materials between the layers to cause intumescence upon exposure to heat, such as:

expandable graphite, clay, mica, or pearlite, which comprises one or more of sulphuric acid, nitric acid, phosphoric acid, organic acids such as acetic or phenolic acids, and salts thereof, chlorine and bromine gas intercalated between adjacent crystalline layers; expandable graphite intercalated with a sulphur or phosphorus containing compound is preferred;

vermiculite, preferably in the shape of interstratified layers of vermiculite and biotite, In one embodiment of the present invention, the intumescent sealing member is a coating layer of unexpanded thickness preferably comprised between 0.1 and 3.0 mm, more preferably between 0.2 and 1.0 mm, most preferably between 0.3 and 0.6 mm. Said coating layer may be optionally covered by a final sealing layer as for instance a standard graphite mixture. The sealing member may thus be coated over a substantial portion, preferably the whole of the first and/or second coupling surfaces. Alternatively the sealing member may be applied into a groove on the first and/or the second coupling surfaces, circumscribing at least partly the first and/or second bore apertures, respectively. The groove is preferably at least 0.5 mm deep, more preferably at least 1.0 mm deep, most preferably, at least 3.0 mm deep.

In an alternative embodiment, the sealing member may be in the form of a gasket, preferably nested in a groove on the first and/or the second coupling surfaces, circumscribing at least partly the first and/or second bore apertures, respectively.

The sealing member may comprise:
5-95 wt. % of an intumescent material, comprising expandable graphite and/or vermiculite;
5-95 wt. % of a binder, such as water glass, preferably admixed with one or more of clay, $Na_2CO_3$, $CaCO_3$, $MgCO_3$, $NaHCO_3$, $Ca(HCO_3)_2$, $Mg(HCO_3)_2$;
0-80 wt. % or 0.1-80 wt. % of a lubricant, such as (non expandable) graphite;
0-20 wt. % or 0.1-20 wt. % of an antioxidant such as aluminium, silicon or molybdenum,
wherein the wt. % are measured as solids dry weight with respect to the total dry weight of the sealing member composition.

In a preferred embodiment, the intumescent material is encapsulated in a microshell which can flow, volatilize or degrade upon exposure to a given temperature, or to a mechanical stress, such as shearing upon sliding one coupling surface over the other. Such microshells are advantageously composed of water glass, colloidal silica or aluminium phosphate, preferably in combination with one or more of clay, $Na_2CO_3$, $CaCO_3$, $MgCO_3$, $NaHCO_3$, $Ca(HCO_3)_2$, or $Mg(HCO_3)_2$, preferably present in an amount in the range of 0.5-80 wt. %, more preferably 5-30%. Such protective shell layer can be:

applied onto a primer, preferably composed of a mixture of phenolic resin and furfural in a weight ratio comprised between 3:8 and 3:1, preferably between 1:1 and 3:2, said primer being applied directly onto the intumescent flakes; and/or covered by a finishing top layer, preferably comprising a mixture of phenolic resin and furfural.

This embodiment is particularly suitable for exchangeable pouring nozzles because they are often preheated prior to mounting onto a tube exchange device. Indeed, encapsulation ensures that the intumescent material starts swelling only when the first coupling surface is mounted in a nozzle assembly and exposed to shear stresses upon sliding and/or to high temperatures when in casting position.

The present invention also concerns a refractory element of a nozzle assembly for a metal casting apparatus, said refractory element comprising a first through bore opening at a first, substantially planar coupling surface suitable or configured for being coupled in a sliding translation relationship with a second coupling surface of a second refractory element, characterized in that, the first coupling surface of said refractory element is provided with a sealing member comprising a thermally intumescent material. The sealing member and intumescent material is preferably as discussed above. The refractory element of the present invention is preferably one of:

a pouring nozzle suitable or configured for being loaded in and unloaded out of a tube exchange device;

an inner nozzle configured to be mounted in the bottom floor of a vessel and fixed to a tube exchange device;

a sliding plate in a slide gate device mounted under a ladle or a tundish;

a fixed plate in sliding contact with a sliding plate (25) in a slide gate device mounted under a ladle or a tundish.

The present invention also concerns a method for producing a refractory element as discussed supra comprising the following steps:

(a) providing a refractory element comprising a first through bore (3) opening at a first coupling surface, said first coupling surface being suitable for being coupled in a sliding translation relationship with a second coupling surface of a second refractory element;

(b) applying a sealing member onto the first coupling surface, such as to preferably circumscribe the bore aperture, characterized in that, the sealing member comprises a thermally intumescent material.

The sealing member can be applied to the first coupling surface as:

a coating covering the whole or a portion only of the first coupling surface, by brushing, spraying, use of a squeegee or of a roller, printing, such as screen printing or gravure printing;

a coating filling a groove provided on the first coupling surface and circumscribing the aperture of the through bore by injection, squeegee, casting; or a preformed gasket fitting into a groove provided on the first coupling surface and preferably circumscribing the aperture of the through bore.

Once a refractory element comprising an intumescent sealing member circumscribing a bore aperture on a first coupling surface thereof has been produced by the foregoing method, it can be:

coupled by slide translating said first coupling surface over a second coupling surface comprising a second bore aperture of a second refractory element of the nozzle assembly, such that the sealing member contacts both first and second coupling surfaces and bringing the first and second bore apertures into and out of registry, to define, when in registry, a continuous through bore from a molten metal inlet to a molten metal outlet; the thus coupled first and second refractory elements can then be, heated to a temperature at least sufficient to swell the intumescent material of the sealing member.

At this point, the casting of molten metal through the nozzle assembly can take place with little risk of air intake through the joint between first and second refractory elements. The heating step to a temperature sufficient to swell the intumescent material may rely on the heat of the molten metal being transferred to the intumescent material or imply another source of heat like a separate burner or others.

In case the first refractory element and sealing member are pre-heated at a pre-heating temperature prior to coupling to the second refractory element, the intumescent material should be prevented from reaching its maximum expansion before being mounted into a corresponding nozzle assembly. This can be achieved:

by maintaining the pre-heating temperature below the temperature, $T_{max}$, of maximum expansion of the intumescent material, and preferably below the initial swelling temperature, $T_i$, or by encapsulating the intumescent material into shells which are chemically and/or mechanically and/or thermally damaged upon sliding the first refractory element into casting position into the nozzle assembly and/or (ii) upon casting molten metal.

BRIEF DESCRIPTION OF THE DRAWINGS

Various embodiments of the present invention are illustrated in the attached Figures.

DETAILED DESCRIPTION OF THE INVENTION

The present invention solves in a simple and reliable way the problem of preventing air from being sucked into the molten metal flowing through a nozzle assembly by Venturi effect through the interface between two refractory elements. The present invention is particularly advantageous for sealing the interface between two refractory surfaces which are coupled in a sliding translation relationship, such as in a sliding gate or a tube exchange device as illustrated in FIGS. 2 to 4. When two refractory elements are coupled statically, it is somewhat easier—albeit still a challenge—to seal the joint between the two parts. When two elements are coupled dynamically, the challenge of sealing the joint between the two is increased substantially. The present invention meets this challenge.

When two refractory elements are to be coupled in a translation sliding relationship, such as an exchangeable pouring nozzle (32) in a tube exchange device (30) mounted at the bottom of a tundish as illustrated in FIGS. 3 and 4, or a sliding gate (25) in a slide gate device (20) as illustrated in FIG. 2, it is extremely difficult to ensure a complete tightness between the coupling surfaces (1a, 11a) of the two refractory elements. Indeed, the clamping forces applied to dynamically coupled elements cannot be as high as between statically coupled elements, lest sliding between the two coupling surfaces be hindered, which increases the risk of a gap between the two elements. The sliding of one coupling surface over the other may create scratches at the joint, which may easily turn into leaking passageways for the air. Finally, it is not possible to seal the joint between two elements with a bead running at the periphery of said joint, because the bead would be broken when moving one element with respect to the other. The present invention solves this long known—albeit never satisfactorily solved—problem in a very simple, cheap and efficient way, by providing between the first and second coupling surfaces of two refractory elements a sealing element (2) comprising a thermally intumescent material. Strictly speaking, the term "thermally" is redundant, since intumescent materials are defined as materials which swell upon exposure to heat, but it was deemed necessary to specify the term "thermally" to avoid any (unjustified) extension of the term 'intumescent' to swelling caused by other sources, such as exposure to water, which would be unacceptable in a molten metal casting nozzle assembly.

There is a large variety of intumescent materials with differing properties. They are widely used in fireproofing applications. In such applications, the endothermic release of water by hydrates upon exposure to heat generated by a fire is taken advantage of to maintain the temperature of a structure low and the char produced by such material is generally a poor heat conductor. They are usually applied in fireproof doors, windows, and pipes. For the sake of the present invention, the important features of intumescent materials are their expansion characteristics. An intumescent sealing member (2) particularly suitable for the present invention should preferably have an initial expansion temperature, $T_i$, of at least 130° C., preferably at least 400° C., more preferably at least 600° C. The maximum relative expansion, $V_{max}/V_{20}$, at a temperature, $T_{max}$, of maximum expansion comprised between, $T_i$, and 1400° C., with respect to its volume measured at 20° C., should preferably be at least 10, preferably at least 25, more preferably at least 50, most preferably at least 80.

Intumescent materials are generally composed of a layered host material which is modified by intercalating other materials between adjacent layers. Upon heating, the material intercalated between layers changes phase, generally turning into gas and thus strongly increasing in volume, and produces a strong pressure pushing apart adjacent layers of the host material. This sudden and sometimes substantial expansion is called intumescence, or exfoliation. The expansion magnitude for a given host material depends on a number of parameters. First, the nature of the intercalated material affects expansion magnitude and the temperature at which expansion occurs. For a given intumescent material, the size of the host material particles may also influence the expansion ratio of the material. The heating rate of an intumescent material may also affect its response to heat, a slow heating rate reducing expansion, compared with a high heating rate. Finally, encapsulating an intumescent material may also delay swelling of the material.

Examples of intumescent materials suitable for use in the sealing element (2) of a nozzle assembly according to the present invention comprise one or a mixture of:

expandable graphite, clay, mica, or pearlite, which comprises one or more acids and salts thereof, such as sulphuric acid, nitric acid, phosphoric acid, organic acids such as acetic or phenolic acids, as well as halogens, alkali metals, aluminium chloride, ferric chloride, other metal halides, arsenic sulphide, thallium sulphide, chlorine and bromine gas intercalated between adjacent crystalline graphene layers;

vermiculite, preferably in the shape of interstratified layers of vermiculite and biotite as disclosed for example in U.S. Pat. No. 5,340,643, which disclosure is herein incorporated by reference; Amongst those materials, expandable graphite is preferred.

The sealing material comprises at least one intumescent material, preferably in an amount comprised between 5 and 95 wt. %. Other materials are preferably used:

- a binder can be used to bind together intumescent particles or for encapsulating such particles. An example of suitable binder is water glass, preferably admixed with one or more of clay, $Na_2CO_3$, $CaCO_3$, $MgCO_3$, $NaHCO_3$, $Ca(HCO_3)_2$, $Mg(HCO_3)_2$. The binder is preferably present in an amount of 5-95 wt. %.
- a lubricant is particularly useful to facilitate sliding of a coupling surface over the other. An example of lubricant suitable for the present invention is (non-expandable) graphite. It is preferably present in an amount comprised between 0 and 80 wt. %, preferably between 10 and 50 wt. %, more preferably between 15 and 40 wt. %, most preferably between 20 and 35 wt. %.
- an antioxidant is used to protect the sealing material exposed to extreme thermal conditions. An example of antioxidant is aluminium, which can be present in an amount of 0-20 wt. %, or 0.1-20 wt. %, preferably between 2 and 10 wt. %.

The wt. % are measured as solids dry weight with respect to the total dry weight of the sealing member composition.

Figure 5:
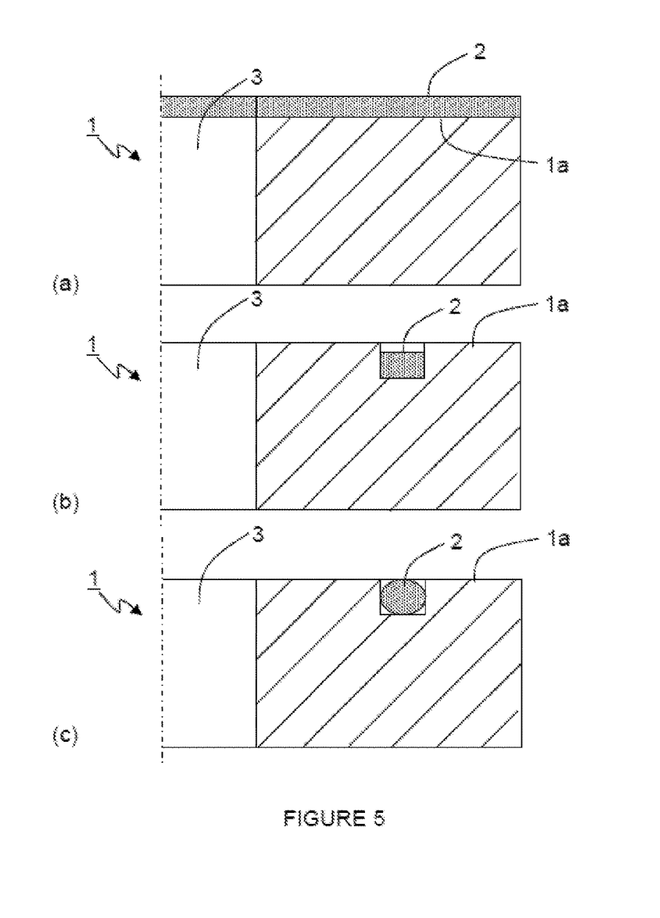
FIG. 5: shows side views of various embodiments of a coupling surface comprising a sealing member in accordance with the present invention

The sealing member (2) can be in the form of a coating on a coupling surface (1a, 11a). The sealing member (2) may be coated over a substantial portion, preferably the whole of the first and/or second coupling surfaces (1a, 1b) (cf. FIG. 2, bottom of sliding plate (25) and FIGS. 3 and 5(a)). The shell thickness of the unexpanded coating can be of the order of 0.1 to 3.0 mm, preferably of 0.2 to 1.0 mm, more preferably of 0.3 to 0.6 mm. Alternatively, the intumescent coating may be applied into a groove circumscribing (at least partly) the bore (3a) as illustrated in FIG. 5(b). The groove may be at least 0.5 mm deep, preferably at least 1.0 mm deep, most preferably, at least 3.0 mm deep, and is preferably filled with unexpanded sealing material to at least 50% of the depth thereof, preferably at least 75%. The groove may also be fully filled with sealing material flush with the coupling surface in its unexpanded state.

In an alternative embodiment, the sealing member (2) may be formed into a gasket (cf. FIG. 2, top of sliding gate (25), FIGS. 3 and 5(c)). Such gasket can be positioned into a groove circumscribing (at least partly) the bore (3a) as illustrated in FIG. 5(c).

To avoid a thermal shock, refractories are pre-heated prior to being mounted and contacted with molten metal at high temperatures. In some cases, the pre-heating is performed in situ, but sometimes it is performed in a furnace separate from the casting installation. This is called "offline preheating." This is typically the case in tube exchange devices (30), wherein a new pouring nozzle is preheated to a preheating temperature in a furnace prior to loading it into the device and sliding it into casting position in order to prevent crack formation due to too high thermal shock. In offline pre-heating, there is a risk of early expansion of the sealing member (2) during the preheating and transfer stages, which should be avoided. This can be achieved very simply by preheating the pouring nozzle to a temperature below the initial expansion temperature, $T_i$, or at least below the temperature, $T_{max}$, of maximum relative expansion. In a preferred embodiment, the intumescent material is in the form of flakes which are encapsulated in microshells. The microshell should be 'closed' during the preheating stage impeding the expansion of the intumescent material and 'open' during the casting of metal to release the expansion of the sealing member to achieve its high sealing function. The 'opening' of the microshells can be triggered in various ways. The microshells can be made of a material which is solid at the preheating temperature, and melts, volatilizes, or degrades at casting temperature. The term "degrade" may include a potential failure mechanism due to the fact that the force applied by the expandable graphite increases with temperature to a point that it is great enough to rupture the shells. Alternatively or concomitantly, the microshells may be mechanically broken by shear stresses generated upon sliding the coupling surface of a pouring nozzle into the tube exchange device. The microshells are advantageously composed of water glass, colloidal silica or aluminium phosphate, preferably in combination with one or more of clay, $Na_2CO_3$, $CaCO_3$, $MgCO_3$, $NaHCO_3$, $Ca(HCO_3)_2$, or $Mg(HCO_3)_2$, preferably present in an amount in the range of 0.5-80 wt. %, more preferably 5-30%.

The microshells may consist of several layers, the foregoing composition constituting a protective shell layer, which can be applied onto a primer previously coated onto the intumescent flakes, and/or can be capped by a finishing top coating. A primer is advantageous for enhancing the wettability and adhesion of the protective shell layer to the surface of the intumescent flakes, in particular in case of materials having low surface energies like expandable graphite. For example the primer can be composed of a mixture of phenolic resin and furfural in a weight ratio comprised between 3:8 and 3:1, preferably between 1:1 and 3:2, said primer being applied directly onto the intumescent flakes. A finishing top coat can help to stabilise the shell protective layer against chemical attack from the aqueous phase of the final coating that is generally applied to refractory pieces, which typically contains water glass, colloidal silica, aluminium phosphate or other materials. The finishing top layer can comprise a mixture of phenolic resin and furfural.

The graphite coating can consist of one or more layers. Coating materials should be available in a dispersion or solution form, and applied to the intumescent flakes in an amount comprised between 1 and 50 wt. %, preferably 10-20 wt. % of coating solution with respect to the weight of the intumescent flakes, depending on the size and surface area of the intumescent flakes. The coating should be able to dry or set to a hard strong shell preventing oxygen impingement on the intumescent material, and thus reducing its tendency to exfoliate and expand. The shell should also exert mechanical strength sufficient to resist the expansion process at lower temperatures. The expansion of the intumescent material is therefore prevented until such temperature is reached that the shell loses its strength. A second function of the microshells in addition to mechanically restraining the expansion is to reduce the oxygen access to the interlayers of the graphite. This massively reduces the expansion. Once the shells are ruptured, then air can ingress and the expansion is much larger and more powerful.

A sealing member (2) as discussed supra may be applied to various refractory elements (1, 11) of a nozzle assembly (20, 30). In particular, in a tube exchange device (30) mounted on the bottom floor of a vessel (100, 200), such sealing member can be applied to the coupling surface of a pouring nozzle (32) and/or of the inner nozzle (31). As illustrated in FIG. 2, in a slide gate device (20) mounted on the bottom floor of a ladle (100) or of a tundish (200), of the slide gate device and the sliding plates (25) slides between two fixed plates. A sliding plate (25) comprising a bore and sandwiched between an inner nozzle (21) and a collector nozzle (22) can slide to bring the bore in or out of registry with the bore of the inner and collector nozzles (compare FIGS. 2(a)&(c) with FIGS. 2(b)&(d)). There are several types of slide gate devices, the two most current ones being schematically illustrated in FIGS. 2(a)&(b) and 2(c)&(d). The inner nozzle is embedded in the floor of a vessel and coupled to a top fixed plate of the slide gate device. In a first embodiment illustrated in FIGS. 2(a)&(b) the collector nozzle is fixed to the sliding plate (25) and moves together with it as it slides over the contact surface of the top fixed plate. In a second embodiment illustrated in FIG. 2(c)&(d) the collector nozzle is coupled to a bottom fixed plate The sealing member (2) may be applied to the coupling surfaces of a fixed plate and/or on one or both surfaces of a sliding plate (25), depending on the type of slide gate device. A sealing coating (2) applied to the top coupling surface of the sliding plate (25) is illustrated in FIG. 2(c)&(d), and a sealing gasket (2) applied to the top and bottom surfaces of the sliding plate (25) is illustrated in FIGS. 2(a)&(b) and 2(c)&(d), respectively.

A refractory element (1) provided with an intumescent sealing member (2) according to the present invention can be processed without altering significantly the normal production of such traditional refractory elements and only requires an additional coating step of a coupling surface of such refractory elements.

A refractory element (1) comprising according to the present invention an intumescent sealing member (2) circumscribing a bore aperture on a first coupling surface (1a) can be used as follows. It may optionally be preheated to a preheating temperature, taking care to not trigger full expansion of the sealing member during this optional step. Next, the refractory element (1) may be coupled by slide translating said first coupling surface (1a) over a second coupling surface (11a) comprising a second bore aperture of a second refractory element (11) of the nozzle assembly. The slide translation of the coupling surfaces (1a, 11a) brings the first and second bore apertures into and out of registry, to define, when in registry, a continuous through bore from a molten metal inlet (13a) to a molten metal outlet (3b). When exposed to the casting temperature, the sealing member (2) swells applying a pressure to the coupling surfaces (1a, 11a) of the two joined refractory elements (1, 11) and thus efficiently sealing the joint. Casting can proceed with little to no risk of air intake through the joint. The pressure generated by the swelling of the sealing member (2) is much smaller than the clamping pressure applied to couple the two refractory elements (1, 11) together, and therefore does not create any substantial separation of the two elements. The swelling of the sealing material ensures that any gap at the joint is properly filled thus sealing the casting bore (3) from ambient.

As mentioned above, expansion of the intumescent material should be contained during the preheating stage, if any, to prevent it from reaching its full expansion prior to being coupled to a second refractory element in a nozzle assembly. This can be achieved by:
- maintaining the pre-heating temperature below the temperature, $T_{max}$, of maximum expansion of the intumescent material, preferably below the initial expansion temperature, $T_i$, or
- encapsulating the intumescent material into shells which are chemically and/or mechanically and/or thermally damaged (i) upon sliding the first refractory element into casting position into the nozzle assembly and/or (ii) upon casting molten metal.

Table 1 gives five compositions of sealing members suitable for the present invention (EX1-5) and one comparative example (CEX6). In the examples, the expandable graphite is obtained by intercalating sulphate between graphene layers, sometimes called 'graphite bisulphate.' The vermiculite is a mesh 100 powder of composition 37-42% $SiO_2$, 9-17% $Al_2O_3$, 11-23% MgO, 5-18% CaO.

The thermal properties of the sealing member may be modulated according to the requirements. For example, whilst the composition of EX5 is fully expanded at 450° C., the one of EX4 expands only at 650° C. After real scale tests in a tube exchange device of a steel casting production line, SEM-EDX examination of a pouring nozzle which coupling surface was coated with a sealing member of composition EX1 revealed substantially no erosion, with very few pores on the surface area, comparable with the porosity measured in the bulk of the plate. By contrast, similar tests carried out on uncoated refractory plates, and on plates coated with a composition CEX6 revealed substantial erosion with an increase of the surface porosity compared with the bulk porosity, as well as the formation of a thick reaction layer formed on the eroded area, by oxidized CEX6 coating material. Traces of MnO and other oxides were detected at the plate surface, close to the bore, locally reacting and forming with the refractory a lower melting temperature material which was progressively flushed away by the flowing metal. In view of the excellent stability of the nozzle plate coated with the EX1 sealing composition according to the present invention, it is clear that the presence of an intumescent material substantially enhances the tightness of the joint of the present invention, thus extending the service life of the refractory elements and enhancing the quality of the cast metal.

Firing tests carried out at 1000° C. in air suggested that in the absence of a strong binder, both vermiculite (cf. EX2) and expandable graphite tended to strongly oxidize and lose integrity. The addition of a binder, such as water glass to expandable vermiculite and graphite particles improved their resistance to oxidation and the integrity of the coatings (cf. EX1, 3-5).

TABLE 1 composition of sealing members according to the present invention (EX1-5) and prior art (CEX6).

| | EX1 | EX2 | EX3 | EX4 | EX5 | CEX6 |
|---|---|---|---|---|---|---|
| Water glass (wt. %) | 50 | | 13 | 33 | 20 | 48 |
| Clay (wt. %) | 13 | | | | | 12 |
| Expand. Graphite (wt. %) | 17 | | | 33 | 40 | |
| Vermiculite (wt. %) | | 58 | 61 | | | |
| Graphite (wt. %) | 17 | 25 | 26 | 33 | 40 | 32 |
| Aluminium (wt. %) | 4 | | | | | 4 |
| PEG6000 (wt. %) | | 17 | | | | |
| $CaCO_3$ (wt. %) | | | | | | 4 |
| Deionized water (wt. %) | 21 | 83 | 87 | 33 | 60 | 20 |

Wt. % measured with respect to solids weight. Deionized water is added on top of 100 wt. % solids.

The present invention constitutes a breakthrough in metal casting equipment, since the intumescent sealing member (2) applied to a coupling surface (1a) of a refractory element (1) substantially increases the service time of such element, and ensures a metal of better quality, with fewer oxide inclusions formed by reaction with infiltrated air, and with fewer nozzle residues due to erosion of weakened refractory materials than ever achieved to date.

We claim:

1. Nozzle assembly for a metal casting apparatus including a sliding gate or a tube exchange device, said nozzle assembly comprising:
   a first refractory element comprising a first coupling surface which includes a first bore aperture, and
   a second refractory element comprising a second coupling surface, which includes a second bore aperture, the first and second elements being coupled to one another in a sliding translation relationship through their respective first and second coupling surfaces such that the first and second bore apertures can be brought into and out of registry; and
   when in registry, a continuous bore for discharging molten metal from a molten metal inlet to a molten metal outlet of said nozzle assembly, and
   a sealing member provided between the first and second coupling surfaces of the first and second elements,
   wherein the sealing member comprises:
   5-95 wt. % of an intumescent material consisting of expandable graphite;
   5-95 wt. % of a binder consisting of water glass and clay;
   0.1-80 wt. % of a lubricant consisting of nonexpandable graphite; and
   0.1-20 wt. % of an antioxidant consisting of aluminum;
   wherein the wt. % are measured as solids dry weight with respect to a total dry weight of the sealing member composition.

2. Nozzle assembly according to claim 1, wherein the sealing member has a property selected from the group consisting of:
   an initial expansion temperature, Ti, of at least 130° C.;
   a maximum relative expansion, Vmax/V20, at a temperature, Tmax, of maximum expansion between, Ti, and 1400° C., with respect to its volume measured at 20° C., of at least 10; and
   both of these properties.

3. Nozzle assembly according to claim 1, wherein the intumescent material composed of layers; and wherein the sealing member further comprises a component which is intercalated between the layers of the intumescent material to cause intumescence upon exposure to heat.

4. Nozzle assembly according to claim 1, wherein the sealing member is a coating layer of unexpanded thickness from and including 0.1 to and including 3.0 mm.

5. Nozzle assembly according to claim 3, wherein the sealing member is provided according to a process selected from the group consisting of:
   coated over a substantial portion of the first and/or second coupling surfaces, and;
   applied into a groove on the first and/or the second coupling surfaces, circumscribing the first and/or second bore apertures, respectively, wherein the groove is at least 0.5 mm deep.

6. Nozzle assembly according to claim 1, wherein the sealing member is in the form of a gasket.

7. Nozzle assembly according to claim 1, wherein the intumescent material is in a shape of flakes encapsulated in microshells which can flow, volatilize or degrade upon exposure to a given temperature, or to a mechanical stress.

8. Nozzle assembly according to claim 7, wherein the microshells comprise at least one protective shell layer.

9. Nozzle assembly according to claim 8, wherein:
   the protective shell layer is composed of a first material selected from the group consisting of water glass, colloidal silica and aluminium phosphate;
   the first material in the protective shell layer is combined with a second material selected from the group consisting of clay, $Na_2CO_3$, $CaCO_3$, $MgCO_3$, $NaHCO_3$, $Ca(HCO_3)_2$, or $Mg(HCO_3)_2$; and
   the protective shell layer is subjected to a procedure selected from the group consisting of (a) being applied onto a primer, said primer being applied directly onto the intumescent flakes, (b) being covered by a finishing top layer, and (c) both (a) and (b).

10. Nozzle assembly according to claim 9, wherein the primer and finishing top layer comprise a mixture of phenolic resin and furfural.

11. Nozzle assembly according to claim 1, wherein the sealing member comprises from and including 20 wt % to and including 33 wt % water glass.

12. Nozzle assembly according to claim 1, wherein the sealing member comprises from and including 17 wt % to and including 40 wt % expandable graphite.

13. Nozzle assembly according to claim 1, wherein the sealing member comprises from and including 2 wt % to and including 10 wt % aluminum.

14. Nozzle assembly according to claim 13, wherein the sealing member comprises from and including 2 wt % to and including 4 wt % aluminum.

15. Refractory element of a nozzle assembly for a metal casting apparatus, said refractory element comprising a first through bore opening at a first, substantially planar coupling surface configured for being coupled in a sliding translation relationship with a second coupling surface of a second refractory element, wherein the first coupling surface of said refractory element is provided with a sealing member comprising a thermally intumescent material, wherein said first planar coupling surface is a surface selected from the group consisting of:
   the coupling surface of a pouring nozzle configured for being loaded in and unloaded out of a tube exchange device in sliding relationship with a corresponding contact surface of an inner nozzle embedded within the floor of a tundish;
   the coupling surface of an inner nozzle configured to be mounted in the bottom floor of a tundish and fixed to a tube exchange device such that said coupling surface enters in sliding relationship with a pouring nozzle upon introduction of the latter in said tube exchange device; and
   the coupling surface of a slide gate device plate such that said coupling surface enters in sliding relationship with the coupling surface of a second plate of said slide gate, and wherein the sealing member comprises:
   5-95 wt. % of an intumescent material consisting of expandable graphite;
   5-95 wt. % of a binder consisting of water glass and clay;
   0.1-80 wt. % of a lubricant consisting of nonexpendable graphite; and
   0.1-20 wt. % of an antioxidant consisting of aluminum;
   wherein the wt. % are measured as solids dry weight with respect to a total dry weight of the sealing member composition.

16. Refractory element according to claim 15, wherein the intumescent material is composed of a layered material which is modified by intercalating other materials between the layers to cause intumescence upon exposure to heat.

17. Refractory element according to claim 16, wherein a material selected from the group consisting of sulphuric acid, nitric acid, phosphoric acid, organic acids, chlorine gas, and bromine gas is intercalated between adjacent crystalline layers of the intumescent material.

* * * * *